Patented Dec. 3, 1940

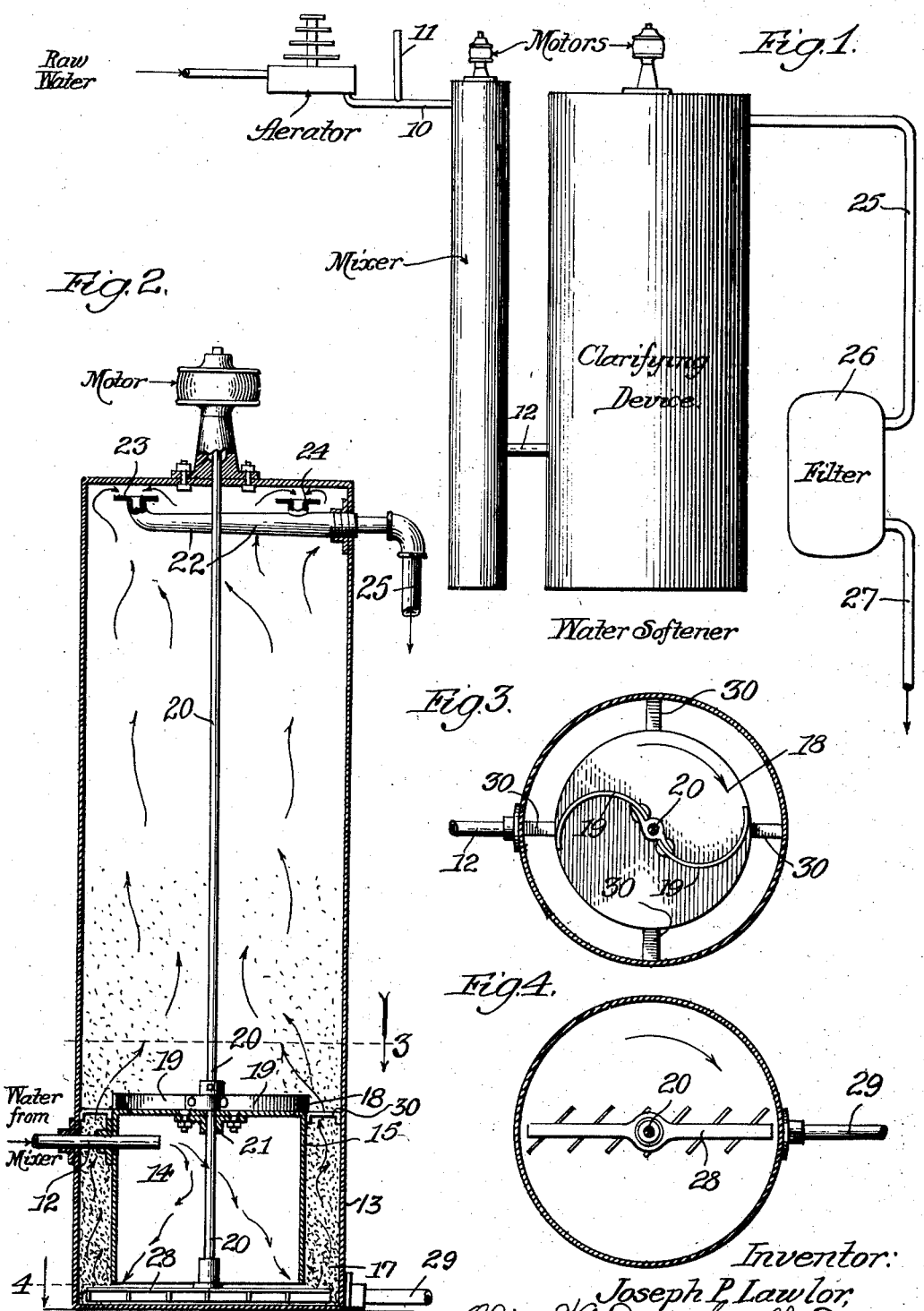

2,223,892

UNITED STATES PATENT OFFICE 2,223,892

WATER SOFTENING

Joseph P. Lawlor, Ames, Iowa

Application May 15, 1939, Serial No. 273,752

11 Claims. (Cl. 210—16)

This invention relates to water softening and purifying. The invention may also be used for other purposes.

An object of the invention is to provide a new method and apparatus whereby sediment or sludge produced in the clarifying operation is utilized in a concentrated and particularly efficient form for speeding up the precipitation and removal of sediment and the purifying of water. A further object is to provide a simple and compact apparatus wherein a stream of water can be continuously treated for softening the water and removing sludge. A further object is to provide a method and means whereby freshly formed sediment precipitate from the main body of water is collected and continuously concentrated in fine form in the restricted path of incoming water where it serves as separated seed for augmenting the removal of sludge from the water. A still further object is to provide a method and means whereby sediment settling from the main body of water is collected on a platform and then mechanically distributed uniformly into a relatively narrow area in which it meets a rising column of introduced water. Other specific objects and advantages will appear as the specification proceeds.

The invention is illustrated in a preferred embodiment, by the accompanying drawing, in which—

Figure 1 is a side view in elevation of apparatus embodying my invention; Fig. 2, a vertical sectional view of the clarifying device; Fig. 3, a transverse sectional view, the section being taken as indicated at line 3 of Fig. 2; and Fig. 4, a transverse sectional detailed view, the section being taken as indicated at line 4 of Fig. 2.

The raw water enters through the pipe indicated in Fig. 1 and passes through the aerator which is of well-known construction. From the aerator, the water runs through pipe 10 into the mixer, which is also of well-known construction. The chemicals for softening the water or purifying it may be introduced directly into the mixer or into the pipe 10 entering the mixer. In the illustration given, I have shown a pipe 11 through which chemicals are introduced into the water before it enters the mixer. The mixer contains a motor-driven device equipped with blades for violently mixing the water and chemicals as they travel downward. Since such a mixer is well known, it is believed unnecessary to describe it in detail. From the mixer, the water flows at an intermediate point through pipe 12 into the clarifying device.

The clarifying device is shown more clearly in Fig. 2. The pipe 12 leading from the mixer enters the clarifying tank 13 at an intermediate point and is provided with a downwardly turned opening 14 within an inverted drum 15. The inverted drum is spaced at points from the bottom of the tank 13 by arms 30. With this construction, the introduced water flows outwardly below the drum into the flow passages 17 formed between the walls of the drum 15 and the walls of the tank 13.

The drum 15 provides at its top a platform 18 on which sediment will collect. To move the freshly collected sediment off the platform 18 and into the flow passages 17, I provide a curved distributor blade member 19 which is mounted on shaft 20. The shaft 20 extends to the bottom of tank 13 and is equipped at its bottom with a scraping device 28 equipped with inclined vanes. Rotation of the scraping device causes the settled material to be moved toward the exterior where it is drawn off through the sludge withdrawal pipe 29. The drum 15 is suspended above the bottom of the tank 13 by the arms 30 which are welded to the tank 13 and drum 15.

At the top of the tank 13, I provide a draw-off fitting 22 provided with intake openings 23 and 24. The overflow passes through pipe 25, filter 26, and thence through pipe 27 to the point of use.

The apparatus may be modified in a number of ways to meet special circumstances. For example, some of the sludge accumulating in the flow passages 17 may be passed through any suitable pipe and pumped back into the mixer, thus permitting the old sludge to be mixed with the new water and chemical and to find its way back into the clarifying device through the pipe 14. It will also be understood that the mixer may, if desired, be combined with the clarifying device in one unit.

In the operation of the method and apparatus, the raw water first passes through the well-known aerator. Suitable chemicals, such as lime, soda, etc., may be introduced through pipe 11 into the water leaving the aerator. The chemicals are mixed with the water thoroughly by the violent agitation within the mixer, and the water and chemicals pass from thence through pipe 12 into the inverted drum 15. From the drum, the water passes below the edges thereof and up through the passages 17 into the main settling chamber. The carbonates and hydroxides formed through the use of lime and other precipitates from the use of other chemicals, form a sludge or slurry which is heavier than water and tends to fall toward the bottom of the tank 13. The clarified water flows through the fitting 22, filter pipe 25, filter 26, and final pipe outlet 27.

In the operation of the present method, I seek to utilize to the fullest extent the freshly formed sediment or precipitate by collecting it upon the table 18 formed by the top of the drum 15 and then distributing it mechanically so as to form a uniform downwardly moving mass of fine particles. The old sludge or precipitate forms a floating filter above the water inlet at the bottom of the drum and is held in substantially uniform cross-section so as to meet the upwardly flowing water. After flowing through the bed of old sludge or slurry, the water meets the more separately disbursed and finely distributed fresh sediment which has been moved off the table 18 into the top of passage 17. The fresh sediment by reason of its large percentage of minute particles and by reason of its more separately disbursed condition, is extremely effective in providing surfaces for the accumulation of sediment particles carried by the water which is passed through the layer of heavier and more compact sludge. The concentration through the means of the mechanical distributor 19 of this body of minute particles in the top of the flow passage 17 is effective in furnishing nuclei which are separated and upon which the precipitate can build. As such particles grow and become heavier, they sink into the bed of heavy sludge below.

In the process and method described, it will be observed that, in the first place, all of the water is caused to pass through a rather uniform area in which the sludge or seed is uniformly arranged. By this arrangement, all of the water receives substantially the same treatment as it rises, and for this reason enables a greater flow of water through the apparatus. Secondly, it will be observed that by collecting the fresh precipitate and mechanically distributing it and concentrating it within restricted flow passages, there is provided, first, a heavy sludge filter through which the rising column of water passes and, secondly, a filter of different characteristics and which is more effective for treating water which is passed through the heavy filter and which has already lost its heavier bodies of sludge, the upper filter body providing freshly formed and fine particles which are held in the water in a more separately disbursed condition.

The speed of operation of the various parts will be according to the requirements of the quantity of water to be treated, the chemicals used, and the results desired. Preferably, a fast mixing operation is carried on within the mixer. In the clarifying device, a relatively slow operation is preferred, agitation being avoided. The curved distributor blade 19 is rotated slowly so as to move the precipitate evenly across the surface of table 18 and into the flow passage 17.

While in the foregoing description, I have given specific details of operation and suggested specific structure, it will be understood that both may be varied widely without departing from the spirit of my invention. I wish it to be understood that I do not desire to be limited to the exact details of construction shown and described, for obvious modifications will occur to a person skilled in the art.

I claim:

1. In a method of the character set forth in which a precipitating agent is mixed with raw water, the steps of introducing the mixture of water and precipitating agent into a quiescent body of water through a restricted and substantially vertical passage of substantially uniform cross-section, collecting precipitate deposited from said body of water and concentrating the same into said vertical passage, and withdrawing purified water from the top of said quiescent body of water.

2. In a method of the character set forth in which a precipitating agent is mixed with raw water, the steps of passing the mixed water and agent into a substantially vertical passage which communicates with a quiescent body of water, maintaining a sludge filter within said passage, collecting freshly deposited precipitate from said quiescent body of water and distributing the same across the top portion of said passage to concentrate the same therein, and withdrawing water from the top of said quiescent body.

3. In a method of the character set forth in which a precipitating agent is mixed with raw water, the steps of introducing the mixture of water and agent into a restricted body of water communicating at its top with a larger and quiescent body of water, providing a collecting surface for receiving freshly deposited precipitate from the quiescent body of water, distributing the precipitate from the collecting surface substantially uniformly across the mouth of said restricted body of water to meet the upwardly flowing introduced water, and withdrawing water from the top portion of said quiescent body of water.

4. In a method of the character set forth in which a precipitating agent is mixed with raw water, the steps of maintaining a large quiescent body of water and a smaller body of water therebelow and communicating therewith, withdrawing water from the top of said first-mentioned body of water, providing in said smaller body of water and in the lower portion thereof a sludge filter, providing above said sludge filter a second filter consisting of finely divided and disbursed precipitate particles substantially uniformly distributed across said smaller body of water and constituting all the precipitate from said first-mentioned body of water, and introducing the raw water mixed with said precipitating agent into said smaller body of water below said first-mentioned filter.

5. In a method of the character set forth, the steps of mixing raw water with a precipitating agent, maintaining a quiescent body of water, introducing said mixed raw water and precipitating agent into the lower portion of said main body of water and through a restricted vertical passage, maintaining across the lower portion of said vertical passage a substantially uniformly concentrated sludge filter, concentrating within the top of said vertical passage precipitate from said first-mentioned body of water, the precipitate being substantially uniformly distributed across the top of said passage, and withdrawing water from the top portion of said first-mentioned body of water.

6. In a method of the character set forth, the steps of mixing raw water with a precipitating agent, maintaining a main body of water in quiescent condition, providing a second body of water of uniform and annular cross-section communicating at its top with said main body of water, maintaining a sludge filter in said second-mentioned body of water, collecting substantially all of the precipitate from said main body of water and distributing the same substantially uniformly across the upper portion of the second-mentioned body of water, and withdrawing water from said main body of water.

7. In apparatus of the class set forth for the clarifying of water mixed with a precipitating agent, a settling tank, means providing a substantially vertical passage communicating with the lower portion of said tank, means for introducing water mixed with the precipitating agent into the bottom of said passage, a platform in the lower portion of said settling tank, means for drawing off water from the top portion of said tank, and means for distributing the precipitate collected on said platform across said vertical passage.

8. In apparatus of the class set forth for the removal of precipitate from water mixed with a precipitating agent, a settling tank, means providing a vertical inlet passage in the lower portion of said tank, means providing a platform upon which precipitate may settle, and mechanical means for moving the collected precipitate across the upper portion of said inlet passage.

9. In apparatus of the class set forth for the removal of precipitate from water mixed with a precipitating agent, a settling tank, means for providing a substantially vertical passage of substantially uniform cross section communicating with the lower portion of said tank, said means also providing a platform for receiving precipitate from the water in the tank, and mechanical means for continuously moving the precipitate from said collecting platform across said vertical passage.

10. In apparatus of the class set forth for the purifying of water, means for mixing raw water with a precipitating agent, a settling tank, an inverted drum centrally disposed within said tank and having its lower edge spaced from the bottom of said tank to provide communication between the interior of said drum and said tank and having its sides spaced from the walls of said tank to provide also vertical flow passages of uniform cross section between said drum and said tank, a pipe extending from said mixer into said drum, a distributor blade mounted for rotation upon the top of said drum for moving the precipitate therefrom across said vertical passages, motor-driven means for rotating said distributor blade, and means for withdrawing water from the top portion of said settling tank.

11. In a method of the character set forth, the steps of mixing raw water with a precipitating agent, maintaining a main body of water in quiescent condition, providing a second body of water of uniform and annular cross section communicating at its top with said main body of water, providing a collecting surface adjacent the top of said second body of water for receiving freshly deposited precipitate from the main body, maintaining in the lower portion of said second body of water a substantially uniformly concentrated sludge filter, mechanically distributing the precipitate from the collecting surface substantially uniformly across the upper portion of the second body of water, withdrawing water from the upper portion of said main body of water, and introducing the mixture of raw water and a precipitating agent into the lower portion of the second body of water.

JOSEPH P. LAWLOR.